(12) United States Patent
Baruch (10) Patent No.: US 10,303,401 B2
(45) Date of Patent: May 28, 2019

(54) DATA CACHING FOR BLOCK STORAGE SYSTEMS

(71) Applicant: INTERNATIONAL BUSINESS MACHINES CORPORATION, Armonk, NY (US)

(72) Inventor: Ofer Baruch, Or-Yehuda (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 82 days.

(21) Appl. No.: 15/416,382

(22) Filed: Jan. 26, 2017

(65) Prior Publication Data

US 2018/0210837 A1 Jul. 26, 2018

(51) Int. Cl.
*G06F 3/06* (2006.01)

(52) U.S. Cl.
CPC ............ *G06F 3/0665* (2013.01); *G06F 3/061* (2013.01); *G06F 3/067* (2013.01); *G06F 3/0643* (2013.01); *G06F 3/0659* (2013.01)

(58) Field of Classification Search
USPC ........................................................ 711/113
See application file for complete search history.

(56) References Cited

U.S. PATENT DOCUMENTS

| 7,103,617 | B2 | 9/2006 | Phatak |
| 7,873,782 | B2 | 1/2011 | Terry et al. |
| 8,407,419 | B2 | 3/2013 | Shea |
| 8,533,410 | B1 * | 9/2013 | Corbett ................... G06F 12/00 707/637 |
| 8,706,694 | B2 * | 4/2014 | Chatterjee ......... G06F 17/30067 707/640 |
| 8,904,120 | B1 * | 12/2014 | Killamsetti ............. G06F 13/00 707/692 |
| 9,213,717 | B1 * | 12/2015 | Pawar ................ G06F 17/30171 |
| 9,389,965 | B1 * | 7/2016 | Douglis ............... G06F 12/0269 |
| 2005/0154825 | A1 * | 7/2005 | Fair ........................ G06F 3/0611 711/113 |

(Continued)

OTHER PUBLICATIONS

Zhao, Yingjie et al., "Bargain Cache: Using File-System Metadata to Reduce the Cache Miss Penalty," 2008 Ninth International Conference on Parallel and Distributed Computing, Applications and Technologies, Dec. 2008, pp. 177-184.

*Primary Examiner* — Mano Padmanabhan
*Assistant Examiner* — Jean C Edouard
(74) *Attorney, Agent, or Firm* — Steven Chiu, Esq.; Blanche E. Schiller, Esq.; Heslin Rothenberg Farley & Mesiti P.C.

(57) ABSTRACT

A file system structure logically stored on a set of logical data volumes of a block storage system is discovered. A request to retrieve a first data block that is logically stored on the set of logical data volumes is received, and responsive to receiving the request, a data file within the file system structure is identified, in which a first portion of the data file is logically stored in the first data block. A second data block logically stored on the set of logical data volumes and physically stored on a set of data storage devices is located, in which a second portion of the data file is logically stored in the second data block. The second data block is read from the set of data storage devices, and stored in a cache memory of the block storage system.

20 Claims, 5 Drawing Sheets

(56) References Cited

U.S. PATENT DOCUMENTS

| | | | |
|---|---|---|---|
| 2005/0216788 A1* | 9/2005 | Mani-Meitav | G06F 11/1456 714/6.32 |
| 2006/0047926 A1* | 3/2006 | Zheng | G06F 3/0608 711/162 |
| 2006/0179261 A1* | 8/2006 | Rajan | G06F 17/30067 711/162 |
| 2007/0226404 A1* | 9/2007 | Ito | G06F 3/061 711/103 |
| 2007/0233941 A1* | 10/2007 | Lee | G06F 12/0246 711/103 |
| 2008/0133872 A1* | 6/2008 | Fair | G06F 12/0862 711/204 |
| 2012/0054436 A1* | 3/2012 | Duvvuru | G06F 12/0862 711/118 |
| 2012/0179891 A1* | 7/2012 | Edwards | G06F 17/30233 711/203 |
| 2012/0271868 A1* | 10/2012 | Fukatani | G06F 3/0608 707/822 |
| 2013/0132955 A1 | 5/2013 | Bolte et al. | |
| 2014/0019704 A1* | 1/2014 | Edwards | G06F 3/061 711/170 |
| 2015/0058562 A1* | 2/2015 | Vaghani | G06F 9/5022 711/114 |
| 2015/0205535 A1 | 7/2015 | Joshi et al. | |

* cited by examiner

DATA CACHING FOR BLOCK STORAGE SYSTEMS

BACKGROUND

Block-level data storage systems, also known as block storage systems, such as XIV offered by International Business Machines Corporation, Armonk, N.Y. and VSP offered by Hitachi, Ltd., typically serve one or more client computers by performing physical block-level read and write data operations on multiple physical data storage devices. Typically, one or more logical data volumes are created by an administrator of a block storage system, where a logical data volume may be distributed across multiple physical data storage devices. A client computer is given access to a logical data volume which the client computer's operating system formats and manages in accordance with a file system of its choosing. When the client computer performs a read or write data operation on a data file in its file system, it expresses this operation as a logical block-level data operation request in relation to its logical data volume and sends this request to the block storage system which performs a corresponding physical block-level data operation at a physical data storage location corresponding to the logical data block in the logical data volume.

SUMMARY

In one aspect of the invention, a data caching method is provided, which includes discovering a file system structure logically stored on a set of one or more logical data volumes of a block storage system, and receiving a request to retrieve a first data block, in which the first data block is logically stored on the set of logical data volumes. Based on receiving the request to retrieve the first data block, a data file within the file system structure is identified, in which a first portion of the data file is logically stored in the first data block. Further, a second data block logically stored on the set of logical data volumes and physically stored on a set of one or more data storage devices is located, in which a second portion of the data file is logically stored in the second data block. The second data block is read from the set of data storage devices, and stored in a cache memory of the block storage system.

In other aspects of the invention, systems and computer program products embodying the invention are provided.

Additional features and advantages are realized through the techniques described herein. Other embodiments and aspects are described in detail herein and are considered a part of the claimed aspects.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
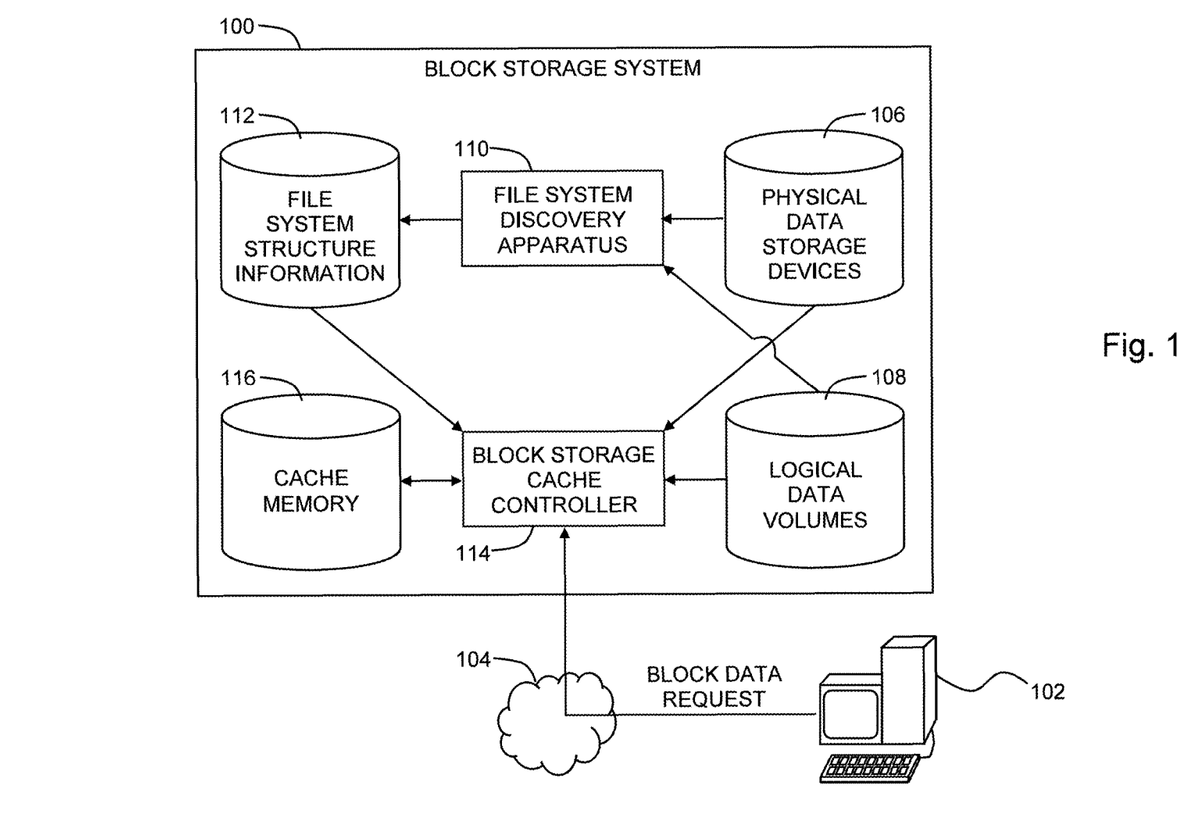
FIG. 1 is an example conceptual illustration of a data caching system, constructed and operative in accordance with an embodiment of the invention.

Reference is now made to FIG. 1, which is an example conceptual illustration of a data caching system, constructed and operative in accordance with an embodiment of the invention. In the system of FIG. 1, a block storage system 100 is configured in accordance with conventional techniques, except as is otherwise described herein, to provide block-level data storage services for one or more client computers, such as to a client computer 102 via a computer network 104, such as a storage area network (SAN). Block storage system 100 is configured to store data to, and read data from, a set of one or more physical data storage devices 106. In accordance with conventional techniques, one or more logical data volumes 108 are managed by block storage system 100, such as where logical data volumes 108 are created by an administrator of block storage system 100, in which logical block-level data storage locations within logical data volumes 108 are mapped by block storage system 100 to corresponding physical block-level data storage locations within physical data storage devices 106. In accordance with conventional techniques, client computer 102 is given access to one or more specific ones of logical data volumes 108, which the operating system of client computer 102 formats and manages in accordance with a file system of its choosing. When client computer 102 performs a read or write data operation on a data file in its file system, it expresses this operation as a logical block-level data operation request in relation to a logical data block location on logical data volume 108. Client computer 102 sends this request to block storage system 100, which performs a corresponding physical block-level data operation at a physical block-level data storage location on physical data storage devices 106 that corresponds to the logical block-level data storage location in logical data volume 108.

Block storage system 100 includes file system discovery apparatus 110 configured to discover file system structures that are logically stored on logical data volumes 108. Such file system structures include data file identifiers and data file size information, as well as the locations of logical data blocks in which portions of the data files are logically stored on logical data volumes 108. Thus, for example, where client computer 102 is configured with a Microsoft Windows operating system that formats its logical data volume 108 using the New Technology File System (NTFS), file system discovery apparatus 110 is, e.g., to discover the NTFS file system structures that client computer 102 logically stored on its logical data volume 108. File system discovery apparatus 110 is, e.g., configured to discover such file system structures independently of any computer operating systems that manage such file system structures in that file system discovery apparatus 110 does not interact with the computer operating systems in order to discover their file system structures. File system discovery apparatus 110 is, e.g., configured to discover file system structures for various known file systems that are logically stored on logical data volumes 108 and maintain such file system structure information in file system structure information 112. File system structure information 112 may be used to map a given data file in a given file system to the logical data blocks on logical data volume 108 that logically store portions of the data file and that correspond to physical data blocks on physical data storage devices 106 that physically store portions of the data file. File system discovery apparatus 110 is also, e.g., configured to identify various disk storage technologies, such as Redundant Array of Inexpensive Disks (RAID) systems and logical volume managers, such as LINUX Logical Volume Manager (LVM) and B-tree File System (BTRFS), as well as the structure of various types of database files.

Block storage system 100 includes a block storage cache controller 114 configured to receive requests, such as from client computer 102, to retrieve logical data blocks from their associated logical data volumes 108. Block storage cache controller 114 is configured to respond to a request to retrieve a logical data block by identifying a data file within file system structure information 112 where any portion of the data file is logically stored in the requested logical data block. Block storage cache controller 114 locates in their associated logical data volumes 108 one or more other logical data blocks, now referred to as "pre-fetch" data blocks, that logically store other portions of the same data file, and, e.g., does so independently of receiving a request to retrieve any of the pre-fetch data blocks. In one example, block storage cache controller 114 locates such pre-fetch blocks that are logically adjacent to the requested logical data block. Block storage cache controller 114 reads the pre-fetch data blocks from their corresponding physical data blocks on physical data storage devices 106, and stores the pre-fetch data blocks in a cache memory 116. In one example, block storage cache controller 114 is configured to keep track of the data blocks that are stored in cache memory 116 so as to avoid reading physical data blocks on physical data storage devices 106 if they are already present in cache memory 116.

In one embodiment, block storage cache controller 114 is configured to determine that the data file includes ordered data records, such as where the data file is a database file or a spreadsheet file, and that the requested logical data block includes one of the ordered data records, or a portion thereof, in which instance block storage cache controller 114 locates and caches one or more pre-fetch data blocks that logically store one or more of the ordered data records that are logically adjacent to the data record in the requested logical data block.

In one embodiment, block storage cache controller 114 is configured to determine that a currently requested logical data block that is associated with one data file is received in temporal proximity to a previous request for a logical data block that is associated with another data file, and that both data files are alphabetically adjacent to each other in the same file system directory or folder, in which instance block storage cache controller 114 locates and caches one or more pre-fetch data blocks in one or more other data files that are alphabetically adjacent in the same file system directory or folder to the data file with which the requested logical data block is associated.

In one embodiment, block storage cache controller 114 is configured to maintain one or more data blocks or data files in cache memory 116 in response to receiving specific requests to do so from a client computer, where the requests specify the data blocks and data files to be maintained in cache memory 116.

In various embodiments, block storage system 100 is configured to monitor any file system discovered by file system discovery apparatus 110 and provide reports or alerts, such as to an administrator of block storage system 100, regarding file system characteristics, such as:

File system size thresholds
File system fragmentation levels
Corrupted file systems
Data file hotspots
File system related cache usage.

Any of the elements shown in FIG. 1 are, e.g., implemented by one or more computers in computer hardware and/or in computer software embodied in a non-transitory, computer-readable medium in accordance with conventional techniques.

Figure 2A:
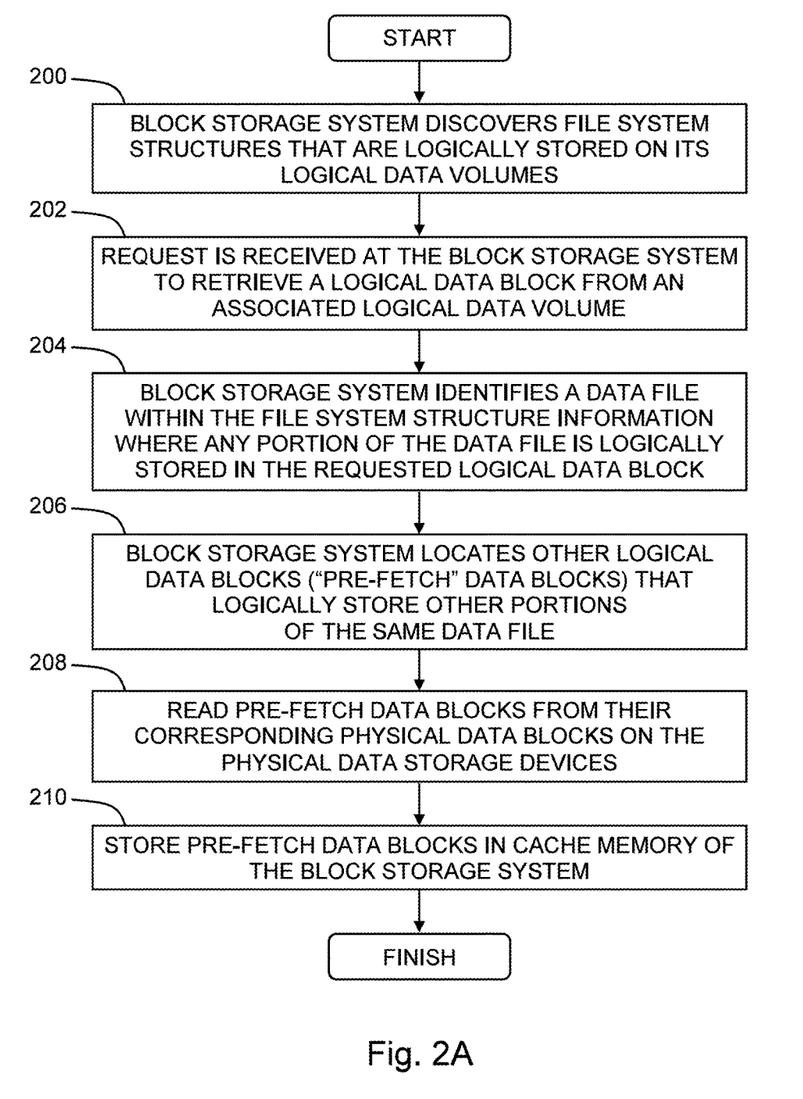
FIGS. 2A, 2B, and 2C are flowchart illustrations of example methods of operation of the system of FIG. 1, operative in accordance with embodiments of the invention.

Reference is now made to FIG. 2A, which is one example of a flowchart illustration of an example method of operation of the system of FIG. 1, operative in accordance with an embodiment of the invention. In the method of FIG. 2A, a block storage system discovers file system structures on its logical data volumes (step 200). When a request is received at the block storage system to retrieve a logical data block from an associated logical data volume (step 202), the block storage system identifies a data file within the file system structure information where any portion of the data file is logically stored in the requested logical data block (step 204). The block storage system locates one or more other logical data blocks ("pre-fetch" data blocks) that logically store other portions of the same data file (step 206). The pre-fetch data blocks are read from their corresponding physical data blocks on the physical data storage devices (step 208). The pre-fetch data blocks are stored in cache memory of the block storage system (step 210).

Figure 2B:
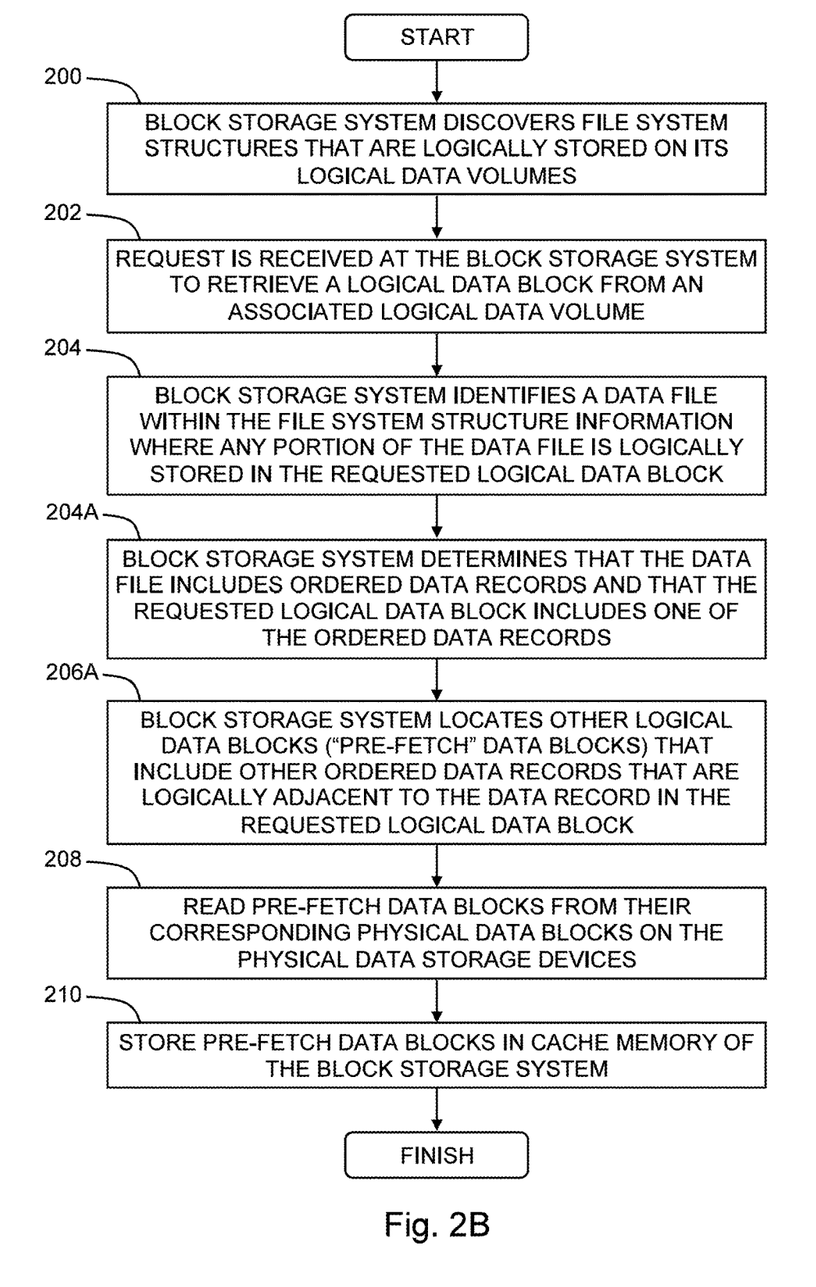

Reference is now made to FIG. 2B, which is one example of a flowchart illustration of an example method of operation of the system of FIG. 1, operative in accordance with an embodiment of the invention. The method of FIG. 2B is substantially similar to the method of FIG. 2A, with the notable exception that the block storage system determines that the data file includes ordered data records, such as where the data file is a database file or a spreadsheet file, and that the requested logical data block includes one of the ordered data records or a portion thereof (step 204A), in which instance the block storage system locates one or more other logical data blocks ("pre-fetch" data blocks) that logically store one or more of the ordered data records that are logically adjacent to the ordered data record in the requested logical data block (step 206A).

Figure 2C:
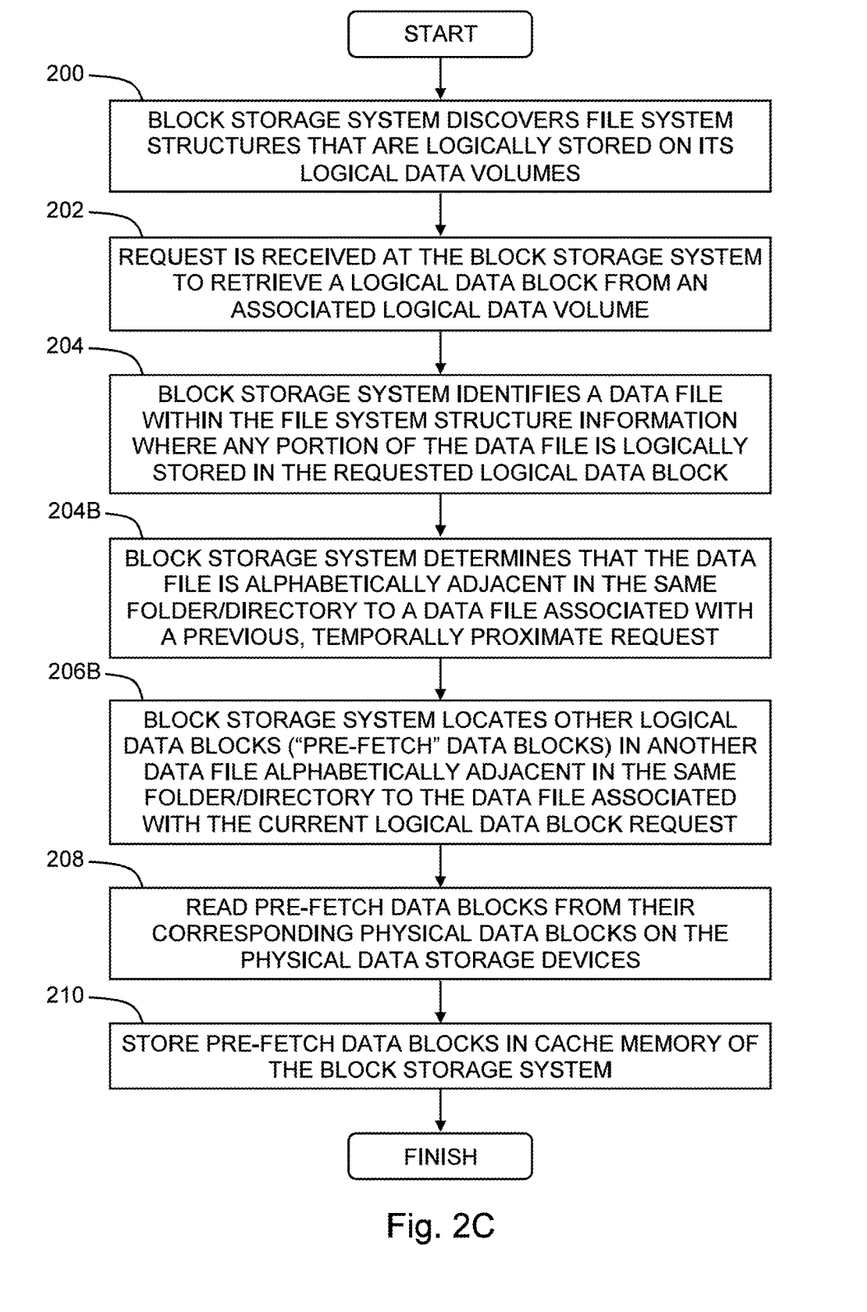

Reference is now made to FIG. 2C, which is one example of a flowchart illustration of an example method of operation of the system of FIG. 1, operative in accordance with an embodiment of the invention. The method of FIG. 2C is substantially similar to the method of FIG. 2A, with the notable exception that the block storage system determines that the currently requested logical data block that is associated with one data file is received in temporal proximity to a previous request for a logical data block that is associated with another data file, and that both data files are alphabetically adjacent to each other in the same file system directory or folder (step 204B), in which instance the block storage system locates one or more other logical data blocks ("pre-fetch" data blocks) in one or more other data files that are alphabetically adjacent in the same file system directory or folder to the data file with which the requested logical data block is associated (step 206B).

Figure 3:
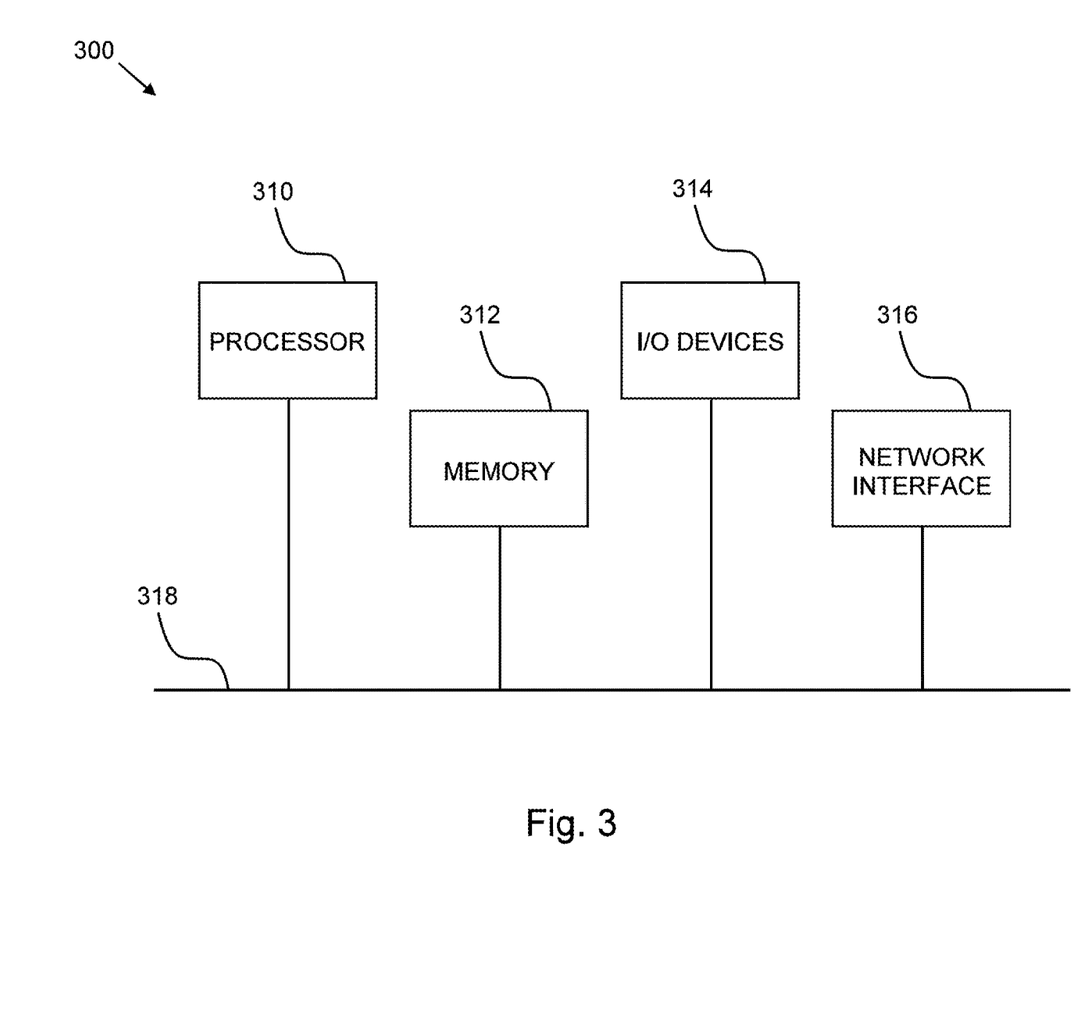
FIG. 3 is a block diagram illustration of an example hardware implementation of a computing system, constructed and operative in accordance with an embodiment of the invention.

Referring now to FIG. 3, block diagram 300 illustrates an example hardware implementation of a computing system in accordance with which one or more components/methodologies of the invention (e.g., components/methodologies described in the context of FIGS. 1-2) may be implemented, according to an embodiment of the invention. As shown, aspects of the invention may be implemented in accordance with a processor 310, a memory 312, input/output (I/O) devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of caching data comprising:
    discovering a file system structure logically stored on a set of one or more logical data volumes of a block storage system, the block storage system comprising a set of one or more data storage devices;
    receiving a request to retrieve a first data block, wherein the first data block is logically stored on the set of one or more logical data volumes, and wherein the block storage system performs a corresponding physical block-level data operation on the set of one or more data storage devices; and
    based on receiving the request to retrieve the first data block:
        identifying a data file within the file system structure, wherein a first portion of the data file is logically stored in the first data block;
        locating a second data block logically stored on the set of one or more logical data volumes and physically stored on a set of one or more data storage devices, wherein a second portion of the data file is logically stored in the second data block;
        reading the second data block from the set of one or more data storage devices; and
        storing the second data block in a cache memory of the block storage system.

2. The computer-implemented method according to claim 1, wherein the discovering is performed independently of a computer operating system that manages the file system structure.

3. The computer-implemented method according to claim 1, wherein the discovering, receiving, identifying, locating, reading, and storing are performed by the block storage system.

4. The computer-implemented method according to claim 1, wherein the locating, reading, and storing are performed independently of receiving a request to retrieve the second data block.

5. The computer-implemented method according to claim 1, wherein:
    the discovering is performed independently of a computer operating system that manages the file system structure;
    the discovering, receiving, identifying, locating, reading, and storing are performed by the block storage system; and
    the locating, reading, and storing are performed independently of receiving a request to retrieve the second data block.

6. The computer-implemented method according to claim 1, wherein the identifying comprises determining that the data file includes a plurality of ordered data records and that the first data block includes a first data record of the plurality of ordered data records.

7. The computer-implemented method according to claim 6, wherein the locating comprises determining that the second data block includes a second data record of the plurality of ordered data records that is logically adjacent to the first data record.

8. The computer-implemented method according to claim 1, wherein the discovering, receiving, identifying, locating, reading, and storing are implemented in computer hardware.

9. A data caching system comprising:
    a block storage system configured to perform a method, said method comprising:
        discovering a file system structure logically stored on a set of one or more logical data volumes of a block storage system, the block storage system comprising a set of one or more data storage devices;
        receiving a request to retrieve a first data block, wherein the first data block is logically stored on the set of one or more logical data volumes, and wherein the block storage system performs a corresponding physical block-level data operation on the set of one or more data storage devices; and
        based on receiving the request to retrieve the first data block:
            identifying a data file within the file system structure, wherein a first portion of the data file is logically stored in the first data block;
            locating a second data block logically stored on the set of one or more logical data volumes and physically stored on a set of one or more data storage devices, wherein a second portion of the data file is logically stored in the second data block;
            reading the second data block from the set of one or more data storage devices; and
            storing the second data block in a cache memory of the block storage system.

10. The data caching system according to claim 9, wherein the discovering is performed independently of a computer operating system that manages the file system structure.

11. The data caching system according to claim 9, wherein the locating, reading, and storing are performed independently of receiving a request to retrieve the second data block.

12. The data caching system according to claim 9, wherein:
    the discovering is performed independently of a computer operating system that manages the file system structure; and
    the locating, reading, and storing are performed independently of receiving a request to retrieve the second data block.

13. The data caching system according to claim 9, wherein the identifying comprises determining that the data file includes a plurality of ordered data records and that the first data block includes a first data record of the plurality of ordered data records.

14. The data caching system according to claim 13, wherein the locating comprises determining that the second data block includes a second data record of the plurality of ordered data records that is logically adjacent to the first data record.

15. A computer program product for caching data, the computer program product comprising:
a computer readable storage medium readable by a processing circuit and storing instructions for performing a method comprising:
discovering a file system structure logically stored on a set of one or more logical data volumes of a block storage system, the block storage system comprising a set of one or more data storage devices;
receiving a request to retrieve a first data block, wherein the first data block is logically stored on the set of one or more logical data volumes, and wherein the block storage system performs a corresponding physical block-level data operation on the set of one or more data storage devices; and
based on receiving the request to retrieve the first data block:
identifying a data file within the file system structure, wherein a first portion of the data file is logically stored in the first data block;
locating a second data block logically stored on the set of one or more logical data volumes and physically stored on a set of one or more data storage devices, wherein a second portion of the data file is logically stored in the second data block;
reading the second data block from the set of one or more data storage devices; and
storing the second data block in a cache memory of the block storage system.

16. The computer program product according to claim 15, wherein the discovering is performed independently of a computer operating system that manages the file system structure.

17. The computer program product according to claim 15, wherein the locating, reading, and storing are performed independently of receiving a request to retrieve the second data block.

18. The computer program product according to claim 15, wherein:
the discovering is performed independently of a computer operating system that manages the file system structure;
the discovering, receiving, identifying, locating, reading, and storing are performed by the block storage system; and
the locating, reading, and storing are performed independently of receiving a request to retrieve the second data block.

19. The computer program product according to claim 15, wherein the identifying comprises determining that the data file includes a plurality of ordered data records and that the first data block includes a first data record of the plurality of ordered data records.

20. The computer program product according to claim 19, wherein the locating comprises determining that the second data block includes a second data record of the plurality of ordered data records that is logically adjacent to the first data record.

* * * * *